(12) United States Patent
Wilding et al.

(10) Patent No.: US 8,972,794 B2
(45) Date of Patent: Mar. 3, 2015

(54) METHOD AND APPARATUS FOR DIAGNOSTIC RECORDING USING TRANSACTIONAL MEMORY

(75) Inventors: Mark Francis Wilding, Barrie (CA); Robert James Blainey, Newmarket (CA); Thomas J. Heller, Jr., Rhinebeck, NY (US); Alexander Abrashkevich, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 12/037,214

(22) Filed: Feb. 26, 2008

(65) Prior Publication Data

US 2009/0217104 A1 Aug. 27, 2009

(51) Int. Cl.
*G06F 11/00* (2006.01)
*G06F 11/36* (2006.01)

(52) U.S. Cl.
CPC .................................. *G06F 11/366* (2013.01)
USPC ........................................................ 714/45

(58) Field of Classification Search
USPC ........................................................ 714/45
See application file for complete search history.

(56) References Cited

U.S. PATENT DOCUMENTS

| | | | |
|---|---|---|---|
| 5,257,358 A | 10/1993 | Cohen | |
| 5,909,574 A | 6/1999 | Meyer | |
| 6,681,280 B1 | 1/2004 | Miyake et al. | |
| 6,697,963 B1 * | 2/2004 | Nouri et al. | 714/31 |
| 7,512,772 B2 | 3/2009 | Gschwind et al. | |
| 7,975,260 B1 * | 7/2011 | Conover | 717/127 |
| 8,032,736 B2 | 10/2011 | Abrashkevich et al. | |
| 2001/0025311 A1 * | 9/2001 | Arai et al. | 709/225 |
| 2003/0009477 A1 * | 1/2003 | Wilding et al. | 707/104.1 |
| 2003/0135720 A1 | 7/2003 | DeWitt et al. | |
| 2003/0217119 A1 * | 11/2003 | Raman et al. | 709/219 |
| 2004/0162967 A1 | 8/2004 | Tremblay et al. | |
| 2004/0230961 A1 * | 11/2004 | Biberstein et al. | 717/150 |
| 2005/0071389 A1 * | 3/2005 | Gupta | 707/204 |
| 2005/0071391 A1 * | 3/2005 | Fuerderer et al. | 707/204 |
| 2005/0114617 A1 * | 5/2005 | Kopylovitz | 711/165 |
| 2005/0120273 A1 * | 6/2005 | Hudson et al. | 714/38 |
| 2006/0117316 A1 | 6/2006 | Cismas et al. | |
| 2006/0179207 A1 | 8/2006 | Eisen et al. | |
| 2007/0143755 A1 | 6/2007 | Sahu et al. | |
| 2007/0162520 A1 | 7/2007 | Petersen et al. | |
| 2007/0186056 A1 | 8/2007 | Saha et al. | |
| 2008/0201616 A1 * | 8/2008 | Ashmore | 714/57 |
| 2009/0165006 A1 * | 6/2009 | Ceze et al. | 718/102 |

* cited by examiner

*Primary Examiner* — Scott Baderman
*Assistant Examiner* — Jigar Patel
(74) *Attorney, Agent, or Firm* — Patterson & Sheridan, LLP

(57) ABSTRACT

A method (500) or a diagnostic recording device (400) having transactional memory and a processor coupled to the transactional memory can store (502) contents of a transaction log (40) of the transactional memory, detect (504) an exception event, and replay (506) last instructions that led up to the exception event using a debugger tool (80). The transactional memory can be hardware or software based transactional memory. The processor can also store the transaction log by storing the contents of the transaction log in a core file (302) which can include a stack (60), a register dump (70), a memory dump (75), and the transactional log. The debugger tool can be used to load up the core file, an executable file (95), and a library (90) to enable the diagnostic recording device to retrace transactions occurring at the diagnostic recording device up to the exception event.

15 Claims, 5 Drawing Sheets

500

STORE CONTENTS OF A TRANSACTION LOG OF THE TRANSACTIONAL MEMORY (OF MOST RECENT MEMORY ACCESSES FOR EXAMPLE IN A CORE FILE)  502

DETECT AN EXCEPTION EVENT  504

REPLAY LAST INSTRUCTIONS THAT LED UP TO THE EXCEPTION EVENT USING A DEBUGGER TOOL  506

METHOD AND APPARATUS FOR DIAGNOSTIC RECORDING USING TRANSACTIONAL MEMORY

FIELD OF THE INVENTION

The present invention relates to the field of diagnostic recording and, more particularly, to a method and apparatus for diagnostic recording using transactional memory.

BACKGROUND

The ability to collect data about a software application's execution as it runs is often referred to as a "flight recorder." The cost of a software application flight recorder, though, is frequently thought of as being cost prohibitive, involving a significant amount of overhead. More specifically, a flight recorder in software is typically built as an in-memory circular buffer that stores frequent activity with very little overhead. The buffer can be dumped out on demand or when a problem occurs. Despite little overhead and despite being very useful when a problem occurs, tracking every read/write into such a buffer can be expensive and can reduce performance by 50% or more. There is usually no "log" and no "transactions" when using a flight recorder. A flight recorder is very simple.

However, the flight recorder does allow, the trace file to be played back for root cause analysis when a problem arises. Thus, there is often no need to reproduce the problem. In many causes, the source of the problem can be determined from a single occurrence. Transactional memory has been used for other purposes, but not for diagnostic recording.

SUMMARY OF THE INVENTION

Hardware-based transactional memory can provide a very useful flight recorder with very little additional investment. Embodiments herein can provide a mechanism to handle a memory exception (or trap) and treat this as similar to a violation. Transactional memory can provide a means to access a memory transaction log for a thread and dump such information as needed to serve as a flight recorder of recent activity. The transaction log can be stored in a core file or other file, and the steps leading up to the exception event or trap can be replayed post-mortem inside the debugger.

The embodiments of the present invention can be implemented in accordance with numerous aspects consistent with the material presented herein. For example, one aspect of the present invention can include diagnostic recording method using (software or hardware-based) transactional memory including the steps of storing a transaction log of the transactional memory (of most recent memory accesses for example), detecting an exception event, and replaying last instructions that led up to the exception event using a debugger tool. The step of storing the transaction log can include storing the transaction log in a core file.

Another aspect of the present invention includes a diagnostic recording device such as a diagnostic flight recorder having transactional memory and a processor coupled to the transactional memory (of most recent memory accesses for example). The processor can be operable to store contents of a transaction log of the transactional memory, detect an exception event, and replay last instructions that led to the exception event using a debugger tool. As noted above, the transactional memory can be hardware-based transactional memory or software-based transactional memory. The processor also can be operable to store the contents of the transaction log by storing contents of the transaction log in a file such as a core file. The core file can include a stack, a register dump, a memory dump, and the transactional log. The processor can be further operable to make a special system call into an operating system to provide call thread access to the transaction log. The processor can be further operable to cause the debugger tool to load the core file, an executable file, and a library to enable the diagnostic recording device to retrace transactions occurring at the diagnostic recording device up to the exception event. The exception event is also known as a trap or trap condition, fault, program check, or violation.

It should be noted that various aspects of the invention can be implemented as a program or a computer implemented method for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Embodiments herein can include, but are not limited to, a hardware-based transactional memory technology that maintains a log of recent memory accesses in a hardware buffer. When a hardware exception (trap, fault, violation, etc.,) occurs, this log can be dumped to a file (or part of a file such as a core file) and used with a debugger for post mortem analysis. The last instructions leading up to the exception can be recorded and replayed with a debugger using the transaction log as a reference. Note that such replaying can be done by a tool or by a human using a debugger or a debugger interface.

The idea is an extension of proposed hardware-based transactional memory models. The log that is required for hardware-based transactional memory can be dumped when a failure occurs and used for debugging purposes (e.g., via a debugger) to replay the last instructions that led to the exception. The cause, although often obfuscated by complexity and overwritten data, can be captured between the transaction log and the virtual memory image for the process or operating system.

Figure 1:
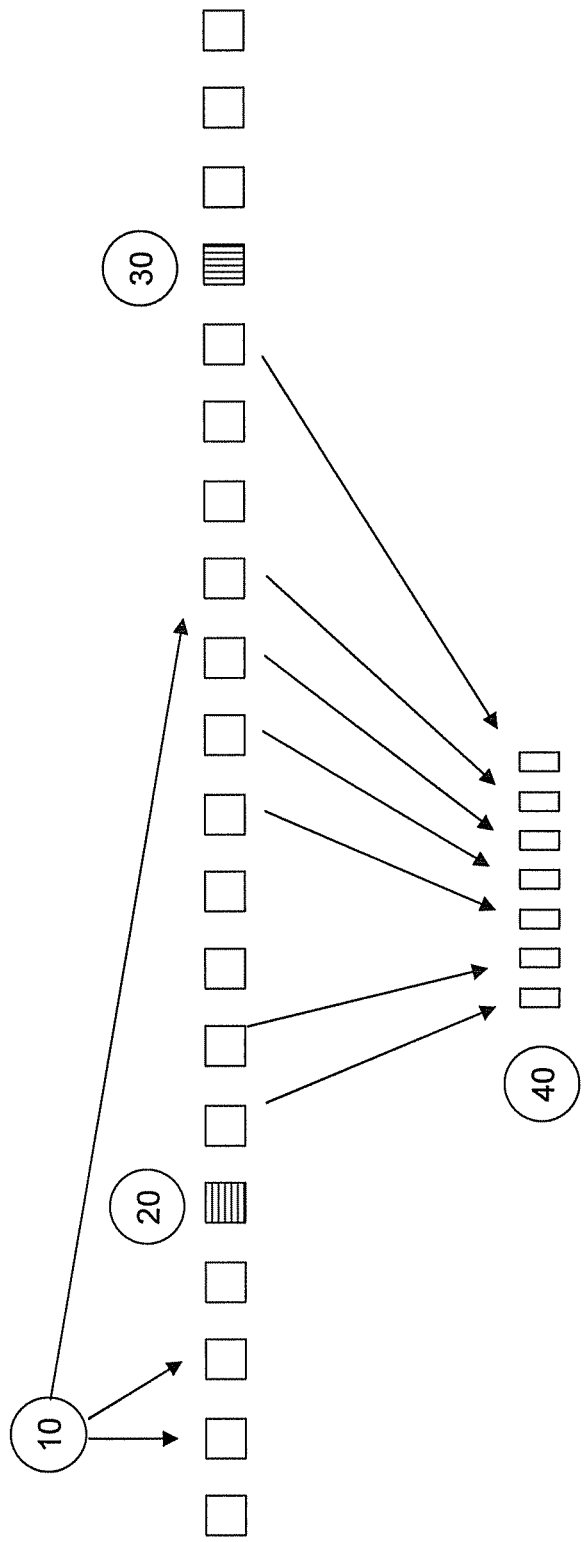
FIG. 1 is a linear representation of instructions executed on a processing unit by a thread in accordance with an embodiment of the present invention.

Referring to FIG. 1, each square represents an instruction run on a CPU for a thread 100. Instructions 10 are normal instructions, an instruction 20 is an open transaction instruction, and an instruction 30 is an end-transaction instruction. Inside of a transaction, the updates and reads to memory will be tracked in a transaction log 40 that can be hardware based (or software based if a software-based transactional memory model is used). Assuming that hardware-based transactional memory becomes an industry standard, programs will run normally with these in-memory transaction logs. The purpose is to identify a break-down of memory access integrity between threads, but the content of transaction logs which will be in memory anyway can also be used for diagnostics as contemplated herein. As contemplated herein, there is no need to turn on the transaction log since the transactional memory can operate as a flight recorder that will be on all of the time (although the primary use is to support transactional memory).

Figure 2:
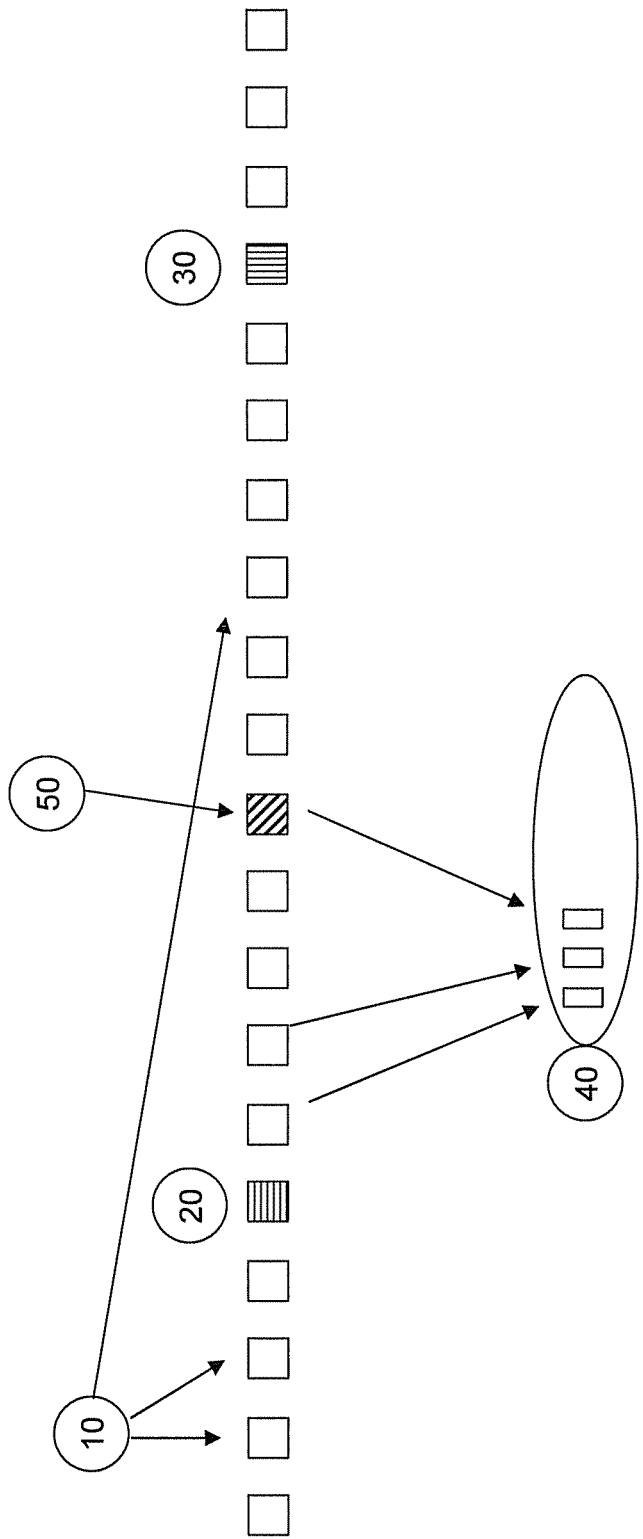
FIG. 2 is an illustration of an exception event or trap condition in accordance with an embodiment of the present invention.

Referring to the thread 200 of FIG. 2, an instruction 50 represents a trap condition. On certain operating systems, such as zOS®, this is called a program check. On other platforms, this is known as a trap, fault, or exception event or condition. The issue is that "something bad happened" that has been noticed by the hardware, such as an invalid memory access. At this point, a trap, signal, fault, exception or program check handler is called. The purpose of this handler is to dump information about the exception event (used as the term from now on) such as a stack trace, registers, or other portions of a core file. In addition to the other types of information, embodiments herein can also include a special system call (a call into the OS) that would give the calling thread access to its own transaction log. The OS can also dump the information along with a core file or similar concept.

Figure 3:
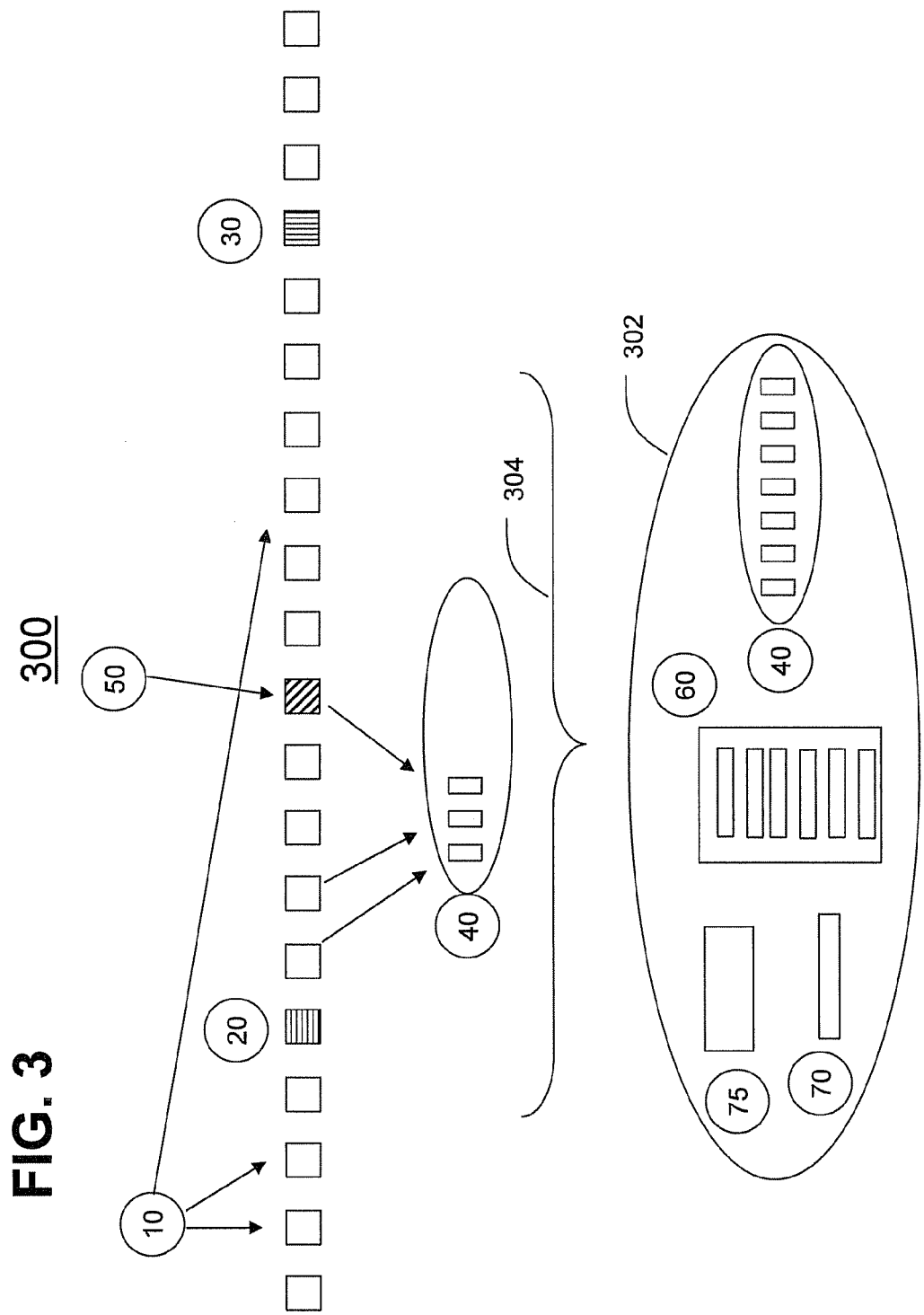
FIG. 3 is an illustration of the handling of the exception event or trap condition by dumping information in accordance with an embodiment of the present invention.
Figure 4:
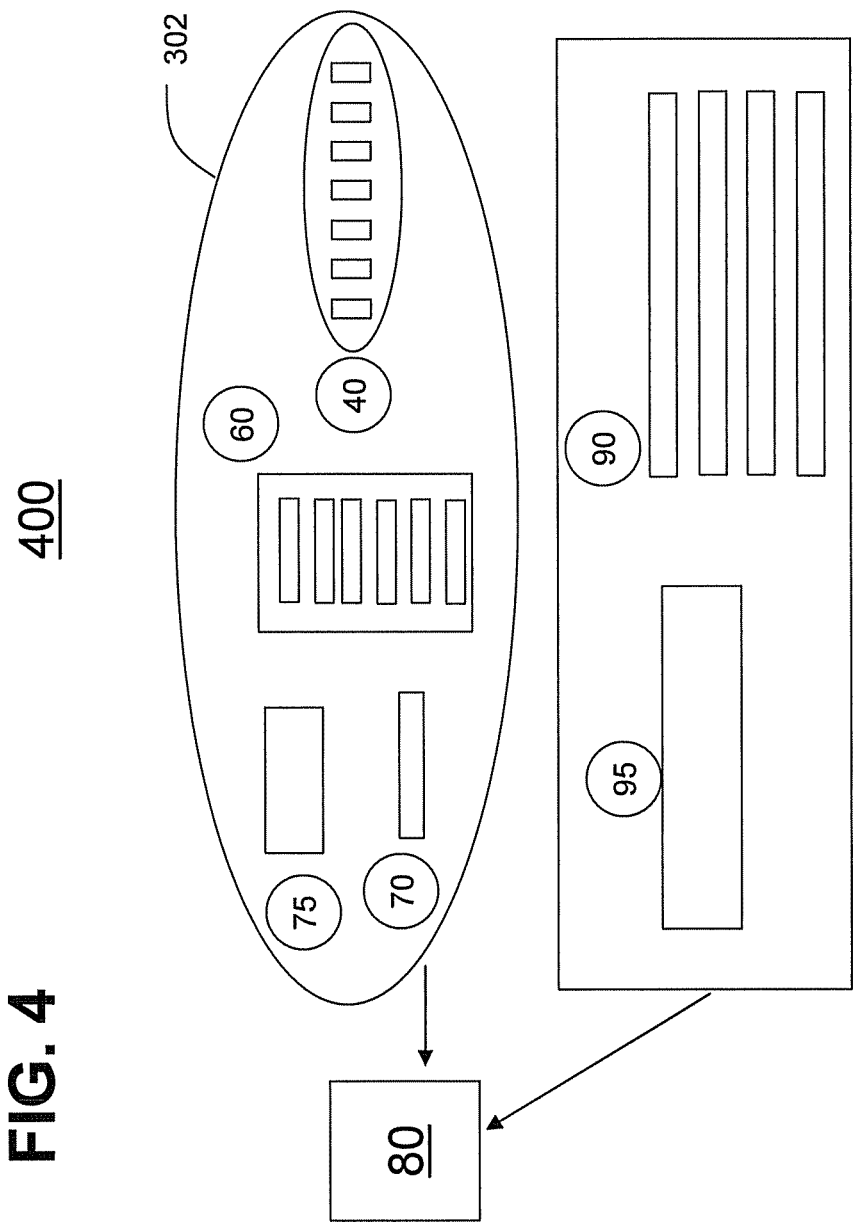
FIG. 4 is a block diagram of the elements used for debugging transactional memory in accordance with an embodiment of the present invention.

As illustrated in FIG. 3, the exception event or trap represented by instruction 50 triggers the trap handling 304 where the dumped information can be a core file 302 that can contain (among other things) a stack 60, a register dump 70, a memory dump 75 and the transaction log or flight recorder 40. FIG. 4 further illustrates a debugger 80 of any kind, the data from the trap condition (including the register dump 70, the transaction log 40, and the stack 60) and a set of libraries 90 and an executable 95. The debugger 80 would load up the executable 95, library 90 and core file 302 (that contains the stack and register dump and memory). The debugger 80 would also have access to the flight-recorder-like transaction log 40. Using this log (originally deemed for hardware-based transactional memory), the debugger 80 can retrace or walk backward in time looking at the impact of each instruction and undo the impact to the real memory that the instruction had (if actually written to memory). Such an arrangement would allow an investigator (tool or human) to replay the transaction up to the point of the trap or exception event. A human or tool (particularly a tool with a debugger interface) can use the debugger or a debugging interface to retrace. Of course, a debugger can be arranged to facilitate such retracing as contemplated herein as a potential embodiment.

Figure 5:
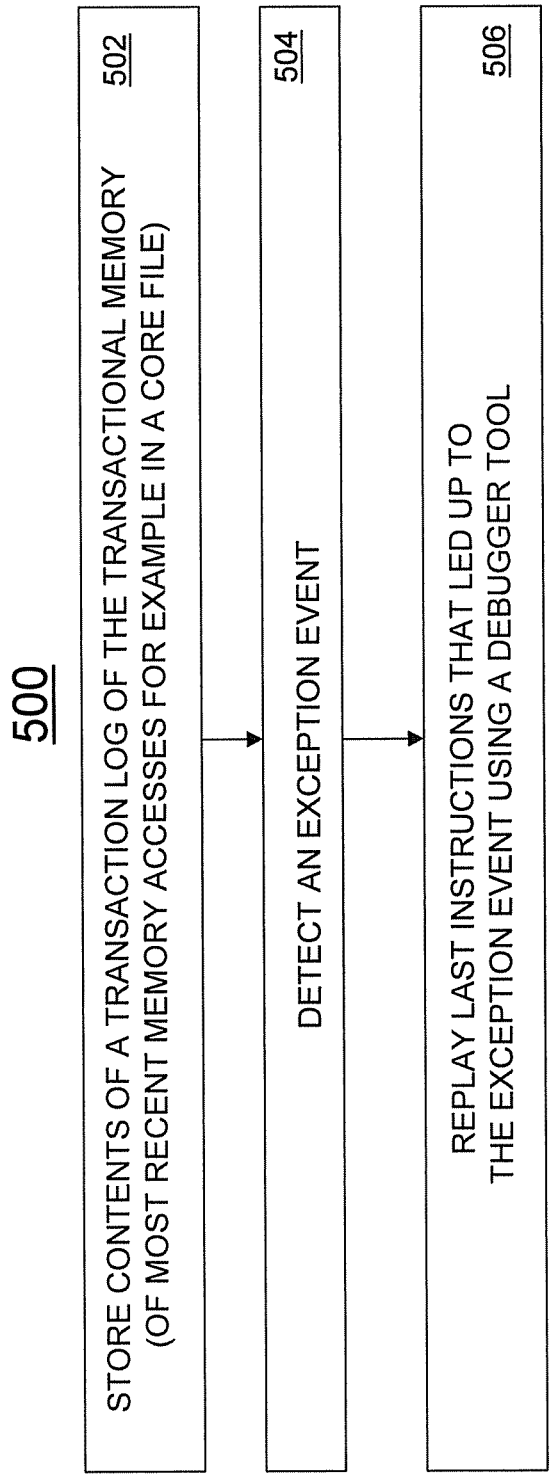
FIG. 5 is a flow chart illustrating a method of diagnostic recording using transactional memory in accordance with an embodiment of the present invention.

Referring to FIG. 5, a flow chart illustrating a diagnostic recording method 500 using (software or hardware based) transactional memory is provided. The method 500 includes storing contents of a transaction log of the transactional memory (of most recent memory accesses for example) at step 502, detecting an exception event at step 504, and replaying last instructions that led up to the exception event using a debugger tool at step 506. The step of storing the contents of the transaction log can include storing the contents of the transaction log in a file such as a core file The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method of gathering diagnostic information in a hardware-based transactional memory system, comprising:
    responsive to detecting an exception event has occurred in a first thread, invoking a system call of an operating system to access a portion, of a transaction log of a hardware-based transactional memory, that corresponds to the first thread, wherein the transaction log is stored in a hardware buffer of the hardware-based transactional memory, wherein the hardware-based transactional memory is configured to record recent memory accesses in the transaction log, wherein the portion of the transaction log includes recent memory accesses for the first thread, and wherein the transaction log is required for operation of the hardware-based transactional memory;
    storing the portion of the transaction log in a core file, wherein the core file further comprises a stack trace, a register dump, and a memory dump; and
    replaying a plurality of instructions that led to the exception event in the first thread via a debugger tool, using the portion of the transaction log stored within the core file.

2. The method of claim 1, wherein the exception event comprises at least one of a trap condition, a program check event, a trap event, a fault event, and an exception condition.

3. The method of claim 1, further comprising:
    further responsive to detecting the exception event has occurred in the first thread, accessing the stack trace and the register dump relating to the first thread; and
    storing the stack trace and the register dump in the core file.

4. The method of claim 3, wherein the stack trace and the register dump are stored as contents of the exception event, and wherein accessing the stack trace and the register dump further comprises accessing the contents of the exception event to retrieve the stack trace and the register dump.

5. The method of claim 1, wherein replaying the plurality of instructions that led to the exception event in the first thread via the debugger tool further comprises:

loading the core file into the debugging tool, together with an executable file for the first thread and one or more libraries associated with the first thread; and retracing a plurality of instructions of the first thread leading up to the exception event, in order to view the impact of each of the plurality of instructions on the contents of the hardware-based transactional memory, using the portion of the transaction log within the core file.

6. A computer program product embodied in a computer-readable storage device, the computer program product comprising instructions executable by a data processing machine that cause the data processing machine to perform an operation for gathering diagnostic information in a hardware-based transactional memory system, comprising:

responsive to detecting an exception event has occurred in a first thread, invoking a system call of an operating system to access a portion, of a transaction log of a hardware-based transactional memory, that corresponds to the first thread, wherein the transaction log is stored in a hardware buffer of the hardware-based transactional memory, wherein the hardware-based transactional memory is configured to record recent memory accesses in the transaction log, wherein the portion of the transaction log includes recent memory accesses for the first thread, and wherein the transaction log is required for operation of the hardware-based transactional memory;

storing the portion of the transaction log in a core file, wherein the core file further comprises a stack trace, a register dump, and a memory dump; and replaying a plurality of instructions that led to the exception event in the first thread via a debugger tool, using the portion of the transaction log stored within the core file.

7. The computer program product of claim 6, wherein the exception event comprises at least one of a trap condition, a program check event, a trap event, a fault event, and an exception condition.

8. The computer program product of claim 6, the operation further comprising:

further responsive to detecting the exception event has occurred in the first thread, accessing stack trace and the register dump relating to the first thread; and storing the stack trace and the register dump in the core file.

9. The computer program product of claim 8, wherein the stack trace and the register dump are stored as contents of the exception event, and wherein accessing the stack trace and the register dump further comprises accessing the contents of the exception event to retrieve the stack trace and the register dump.

10. The computer program product of claim 6, wherein replaying the plurality of instructions that led to the exception event in the first thread via the debugger tool further comprises:

loading the core file into the debugging tool, together with an executable file for the first thread and one or more libraries associated with the first thread; and retracing a plurality of instructions of the first thread leading up to the exception event, in order to view the impact of each of the plurality of instructions on the contents of the hardware-based transactional memory, using the portion of the transaction log within the core file.

11. A hardware-based transactional memory system, comprising:

a processor; and a hardware-based transactional memory containing a program that, when executed by the processor, performs an operation for gathering diagnostic information, comprising:

responsive to detecting an exception event has occurred in a first thread, invoking a system call of an operating system to access a portion, of a transaction log of a hardware-based transactional memory, that corresponds to the first thread, wherein the transaction log is stored in a hardware buffer of the hardware-based transactional memory, wherein the hardware-based transactional memory is configured to record recent memory accesses in the transaction log, wherein the portion of the transaction log includes recent memory accesses for the first thread, and wherein the transaction log is required for operation of the hardware-based transactional memory;

storing the portion of the transaction log in a core file, wherein the core file further comprises a stack trace, a register dump, and a memory dump; and replaying a plurality of instructions that led to the exception event in the first thread via a debugger tool, using the portion of the transaction log stored within the core file.

12. The hardware-based transactional memory system of claim 11, wherein the exception event comprises at least one of a trap condition, a program check event, a trap event, a fault event, and an exception condition.

13. The hardware-based transactional memory system of claim 11, the operation further comprising:

further responsive to detecting the exception event has occurred in the first thread, accessing the stack trace and the register dump relating to the first thread; and storing the stack trace and the register dump in the core file.

14. The hardware-based transactional memory system of claim 13, wherein the stack trace and the register dump are stored as contents of the exception event, and wherein accessing the stack trace and the register dump further comprises accessing the contents of the exception event to retrieve the stack trace and the register dump.

15. The hardware-based transactional memory system of claim 11, wherein replaying the plurality of instructions that led to the exception event in the first thread via the debugger tool further comprises:

loading the core file into the debugging tool, together with an executable file for the first thread and one or more libraries associated with the first thread; and retracing a plurality of instructions of the first thread leading up to the exception event, in order to view the impact of each of the plurality of instructions on the contents of the hardware-based transactional memory, using the portion of the transaction log within the core file.

* * * * *